United States Patent
Jang et al.

(10) Patent No.: US 10,694,456 B2
(45) Date of Patent: *Jun. 23, 2020

(54) NETWORK SELECTION AND RANDOM ACCESS METHOD AND APPARATUS OF MACHINE-TYPE COMMUNICATION USER EQUIPMENT IN MOBILE COMMUNICATION SYSTEM

(71) Applicant: Samsung Electronics Co., Ltd., Suwon-si, Gyeonggi-do (KR)

(72) Inventors: Jaehyuk Jang, Seoul (KR); Boon Loong Ng, Richardson, TX (US); Gert-Jan Van Lieshout, Apeldoorn (NL); Himke Van Der Velde, Zwolle (NL); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,756

(22) Filed: Oct. 22, 2018

(65) Prior Publication Data

US 2019/0059049 A1 Feb. 21, 2019

Related U.S. Application Data

(63) Continuation of application No. 15/589,288, filed on May 8, 2017, now Pat. No. 10,111,165, which is a (Continued)

(30) Foreign Application Priority Data

Mar. 19, 2014 (KR) .................. 10-2014-0032172

(51) Int. Cl.
*H04W 48/18* (2009.01)
*H04W 4/70* (2018.01)
(Continued)

(52) U.S. Cl.
CPC ............. *H04W 48/18* (2013.01); *H04W 4/70* (2018.02); *H04W 74/0833* (2013.01); *H04W 88/02* (2013.01); *H04W 88/08* (2013.01)

(58) Field of Classification Search
CPC ......... H04W 4/00; H04W 4/005; H04W 4/70; H04W 48/10; H04W 48/18; H04W 48/20;
(Continued)

(56) References Cited

U.S. PATENT DOCUMENTS 8,488,542 B2 * 7/2013 Zhou ....................... H04W 8/24
370/329
8,964,793 B2 2/2015 Jang et al.
(Continued)

FOREIGN PATENT DOCUMENTS

CN 102056265 A 5/2011
CN 102273309 A 12/2011
(Continued)

OTHER PUBLICATIONS

Alcatel-Lucent, Alcatel-Lucent Shanghai Bell, PRACH Coverage Enhancement for MTC UE[online], 3GPP TSG-RAN WG1#75 R1-135155, <URL:http://www.3gpp.org/ftp/tsg_ran/WG1_RL1/TSGR1_75/Docs/R1-135155.zip>, Nov. 15, 2013.
(Continued)

*Primary Examiner* — Tri H Phan
(74) *Attorney, Agent, or Firm* — Jefferson IP Law, LLP

(57) ABSTRACT

A network selection, a random access method, and an apparatus of a Machine Type Communication (MTC) User Equipment (UE) for use in a Long Term Evolution (LTE) are provided. A cell selection method of an MTC terminal of the present disclosure includes receiving a message from a base station forming a cell, determining whether the message includes an MTC supportability indicator, and barring, when the message includes no MTC supportability indicator,
(Continued)

scanning a frequency used in communication with the base station during a determined period.

18 Claims, 11 Drawing Sheets

Related U.S. Application Data continuation of application No. 14/662,812, filed on Mar. 19, 2015, now Pat. No. 9,648,445.

(51) Int. Cl.
| | | |
|---|---|---|
| *H04W 74/08* | (2009.01) | |
| *H04W 88/02* | (2009.01) | |
| *H04W 88/08* | (2009.01) | |

(58) Field of Classification Search
CPC . H04W 74/08; H04W 74/0833; H04W 88/02; H04W 88/08
See application file for complete search history.

(56) References Cited

U.S. PATENT DOCUMENTS

| | | | |
|---|---|---|---|
| 9,119,197 B2* | 8/2015 | Xia | H04W 72/042 |
| 9,204,289 B2* | 12/2015 | Jang | H04W 8/24 |
| 9,648,445 B2* | 5/2017 | Jang | H04W 48/18 |
| 9,668,162 B2* | 5/2017 | Frenger | H04W 4/70 |
| 9,877,254 B2* | 1/2018 | Gholmieh | H04W 36/24 |
| 10,111,165 B2* | 10/2018 | Jang | H04W 48/18 |
| 10,111,224 B2* | 10/2018 | Lee | H04W 72/0453 |
| 10,292,077 B2* | 5/2019 | Basu Mallick | H04W 36/04 |
| 2006/0035662 A1 | 2/2006 | Jeong et al. | |
| 2006/0040700 A1 | 2/2006 | Roberts et al. | |
| 2008/0267158 A1 | 10/2008 | Zhang et al. | |
| 2010/0159928 A1 | 6/2010 | Wu | |
| 2010/0177747 A1 | 7/2010 | Chun et al. | |
| 2012/0315874 A1 | 12/2012 | Li et al. | |
| 2013/0083753 A1 | 4/2013 | Lee et al. | |
| 2013/0100895 A1 | 4/2013 | Aghili et al. | |
| 2013/0201830 A1 | 8/2013 | Wang et al. | |
| 2013/0247118 A1 | 9/2013 | Oyman | |
| 2013/0294325 A1 | 11/2013 | Lee et al. | |
| 2013/0343319 A1* | 12/2013 | Quan | H04W 48/02 370/329 |
| 2014/0161024 A1 | 6/2014 | Speight et al. | |
| 2014/0204835 A1 | 7/2014 | Speight et al. | |
| 2014/0254452 A1 | 9/2014 | Golitschek Edler Von Elbwart et al. | |
| 2014/0314048 A1 | 10/2014 | Yi et al. | |
| 2015/0181560 A1 | 6/2015 | Jamadagni et al. | |
| 2015/0181575 A1 | 6/2015 | Ng et al. | |
| 2015/0365976 A1 | 12/2015 | Lee et al. | |
| 2016/0029426 A1 | 1/2016 | Bangolae et al. | |
| 2016/0192376 A1 | 6/2016 | Lee et al. | |
| 2016/0212664 A1 | 7/2016 | Uemura et al. | |
| 2016/0270028 A1 | 9/2016 | Lee et al. | |
| 2016/0278127 A1 | 9/2016 | Sunell et al. | |
| 2016/0353371 A1 | 12/2016 | Zhang et al. | |
| 2017/0048756 A1 | 2/2017 | Sunell | |
| 2017/0070931 A1 | 3/2017 | Huang et al. | |
| 2017/0111756 A1 | 4/2017 | Guo et al. | |
| 2017/0134879 A1 | 5/2017 | Wong et al. | |
| 2017/0135026 A1* | 5/2017 | Frenger | H04W 48/08 |
| 2017/0171739 A1 | 6/2017 | Suzuki et al. | |
| 2017/0207924 A1 | 7/2017 | Lee et al. | |
| 2017/0311355 A1 | 10/2017 | Yi et al. | |
| 2018/0041857 A1 | 2/2018 | Ouchi et al. | |

FOREIGN PATENT DOCUMENTS

| | | |
|---|---|---|
| CN | 102625271 A | 8/2012 |
| EP | 2 595 425 A1 | 5/2013 |
| KR | 10-2013-0018139 A | 2/2013 |
| WO | 2011/119680 A2 | 9/2011 |
| WO | 2013/023191 A1 | 2/2013 |
| WO | 2013/049768 A1 | 4/2013 |
| WO | 2013/169822 A1 | 11/2013 |
| WO | 2014/003436 A1 | 1/2014 |

OTHER PUBLICATIONS

Japanese Office Action dated Dec. 21, 2018, issued in Japanese Application No. 2016-557980.
Chinese Office Action dated Apr. 2, 2019, issued in Chinese Application No. 201580014890.4.
Huawei et al., "MTC indicator at connection setup", Mobile Competence Centre, 650 Route Des Lucioles, F-06921 Sophia-Antipolis Cedex, France, 3GPP TSG-RAN WG2 Meeting No. 72, R2-106296, Nov. 8, 2010, Jacksonville, USA, XP050492091.
Ericsson, "Transport Block Size limitation for low cost MTC UEs", R2-140673, 3GPP TSG-RAN WG2 No. 85, Mobile Competence Centre, 650 Route Des Lucioles, F-06921 Sophia-Antipolis C, Feb. 9, 2014, Prague, Czech Republic, XP050791975.
Ericsson, "Capabilities of low cost/complexity MTC UEs", R2-134299, 3GPP TSG-RAN WG2 No. 84, Mobile Competence Centre, 650 Route Des Lucioles, F-06921 Sophia-Antipolis, Cedex, France, Nov. 13, 2013, San Francisco, USA, XP050737032.
Alcatel-Lucent et al., "Coverage enhancement for RACH messages", 3GPP DRAFT, R1-140153, 3GPP TSG-RAN WG1 Meeting #76, 3GPP, Mobile Competence Centre, 650, Route Des Lucioles, F-06921 Sophia-Antipolis Cedex, France, Feb. 9, 2014, XP050735716, Prague, Czech Republic.
Ericsson, Introduction of dual connectivity in MAC[online], 3GPP TSG -RAN WG2#85 R2-140904, <URL:http://www.3gpp.org/ftp/tsg_ran/WG2_RL2/TSGR2_85/Docs/R2-140904.zip>, Feb. 14, 2014.
Japanese Notice of Allowance dated Sep. 30, 2019, issued in Japanese Application No. 2016-557980.

* cited by examiner

NETWORK SELECTION AND RANDOM ACCESS METHOD AND APPARATUS OF MACHINE-TYPE COMMUNICATION USER EQUIPMENT IN MOBILE COMMUNICATION SYSTEM

CROSS-REFERENCE TO RELATED APPLICATION(S)

This application is a continuation application of prior application Ser. No. 15/589,288, filed on May 8, 2017, which is a continuation application of prior application Ser. No. 14/662,812, filed on Mar. 19, 2015, which was issued as U.S. Pat. No. 9,648,445 on May 9, 2017 and was based on and claimed priority under 35 U.S.C. § 119(a) of a Korean patent application filed on Mar. 19, 2014 in the Korean Intellectual Property Office and assigned Serial number 10-2014-0032172, the entire disclosure of which is hereby incorporated by reference.

TECHNICAL FIELD

The present disclosure relates to a mobile communication system. More particularly, the present disclosure relates to a network selection and random access method and apparatus of a Machine Type Communication (MTC) User Equipment (UE) in a Long Term Evolution (LTE) system.

BACKGROUND

With the rapid advance of communication technology, mobile communication systems have evolved to a 4th Generation (4G) communication systems represented by Long Term Evolution (LTE) standardized 3rd Generation Partnership Project (3GPP).

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The LTE system adopts technologies for supporting various types of User Equipment (UE) including Machine Type Communication (MTC) UE. The MTC UE may be a device, such as an electricity meter and water meter, which is capable of metering consumption of a utility item and reporting the data result automatically and is characterized by low network access priority.

Typically, such an MTC UE configured for the purpose of metering does not need a high data transmission capability and is likely to have low transmit power and be installed in a place such as such as basement and warehouse. There is therefore a need of assorting a UE category requiring coverage expansion function to overcome the low transmit power while operating at a low data rate. For this purpose, new UE category 0 is added in addition to the legacy UE categories in LTE release 12 (the larger the release number, the more recent the version is). The category 0 UE is characterized by the low data rate (e.g., 1 Megabit(s) per second (Mbps)) and may adopt supplementary transmission schemes to secure relatively broad coverage at the low transmit power level. The supplementary transmission schemes may include repetitive transmission scheme.

In order for the network support the supplementary transmission scheme of the UE, the UE has to connect to the evolved Node B (eNB) supporting the corresponding transmission scheme. Also, the UE has to notify the network that the UE is the MTC UE as soon as possible after being connected to the eNB such that the network is capable of recognizing the connection of the MTC UE and applying the supplementary transmission scheme to the MTC UE immediately to maintain a connection stably.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an evolved Node B (eNB)/cell (re)selection method of a Machine Type Communication (MTC) User Equipment (UE) that is capable of allowing the MTC UE to connect the eNB supporting the eNB's UE class with priority and notifying the network of the eNB's MTC UE class as soon as possible.

In accordance with an aspect of the present disclosure, a cell selection method of a category 0 UE (an MTC terminal) is provided. The cell selection method includes receiving a message from a base station forming a cell, determining whether the message includes allowance information regarding an access of the category 0 UE to the cell, and barring, when the message does not include the allowance information, a selection of the cell.

In accordance with another aspect of the present disclosure, a category 0 UE is provided. The category 0 UE includes a transceiver configured to transmit and receive signals to and from a base station forming a cell and a controller configured to determine whether a message received from the base station includes allowance information regarding an access of the category 0 UE to the cell, and to bar, when the message does not include the allowance information, a selection of the cell.

In accordance with another aspect of the present disclosure, a message transmission method of a base station is provided. The message transmission method includes determining whether the base station allows an access of a category 0 UE to a cell formed by the base station, generating, when the base station allows the access of the category 0 UE to the cell, a message including allowance information regarding the access of the category 0 UE to the cell, and transmitting the message to a terminal.

In accordance with another aspect of the present disclosure, a base station is provided. The base station includes a transceiver configured to transmit and receive signals to and from a terminal and a controller configured to determine whether the base station allows an access of a category 0 User Equipment (UE) to a cell formed by the base station, to generate, when the base station allows the access of the category 0 UE to the cell, a message including allowance information regarding the access of the category 0 UE to the cell, and to transmit the message to the terminal.

In accordance with another aspect of the present disclosure, a random access method of a category 0 UE is provided. The random access method includes transmitting, when a Random Access Response (RAR) message is received from a base station, a connection setup request message to the base station and receiving a connection setup message in response to the connection setup request message. The connection setup request message includes a category 0 UE indication information.

In accordance with another aspect of the present disclosure, a category 0 UE is provided. The category 0 UE includes a transceiver configured to transmit and receive to and from a base station and a controller configured to control the transceiver to transmit, when a RAR message is received from a base station, a connection setup request message to the base station and to receive a connection setup message in response to the connection setup request message. The connection setup request message includes terminal category 0 UE indication information.

In accordance with another aspect of the present disclosure, a method of performing, at a base station, a random access procedure with terminal category 0 UE is provided. The method includes receiving a connection setup request message from a terminal, determining whether the terminal is the category 0 UE based on the received connection setup request message, determining whether a size of a connection setup message to be transmitted to the category 0 UE is greater than a message size allowed for the category 0 UE, and transmitting, when the size of the connection setup message is greater than the message size allowed for the category 0 UE, to the category 0 UE the connection message as fragmented or repeated.

In accordance with another aspect of the present disclosure, a base station is provided. The base station includes a transceiver configured to transmit and receive signals to and from a terminal and a controller configured to control the transceiver to receive a connection setup request message from a terminal, to determine whether the terminal is the category 0 UE based on the received connection setup request message, to determine whether a size of a connection setup message to be transmitted to the category 0 UE is greater than a message size allowed for the category 0 UE, and to transmit, when the size of the connection setup message is greater than the message size allowed for the category 0 UE, to the category 0 UE the connection message as fragmented or repeated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
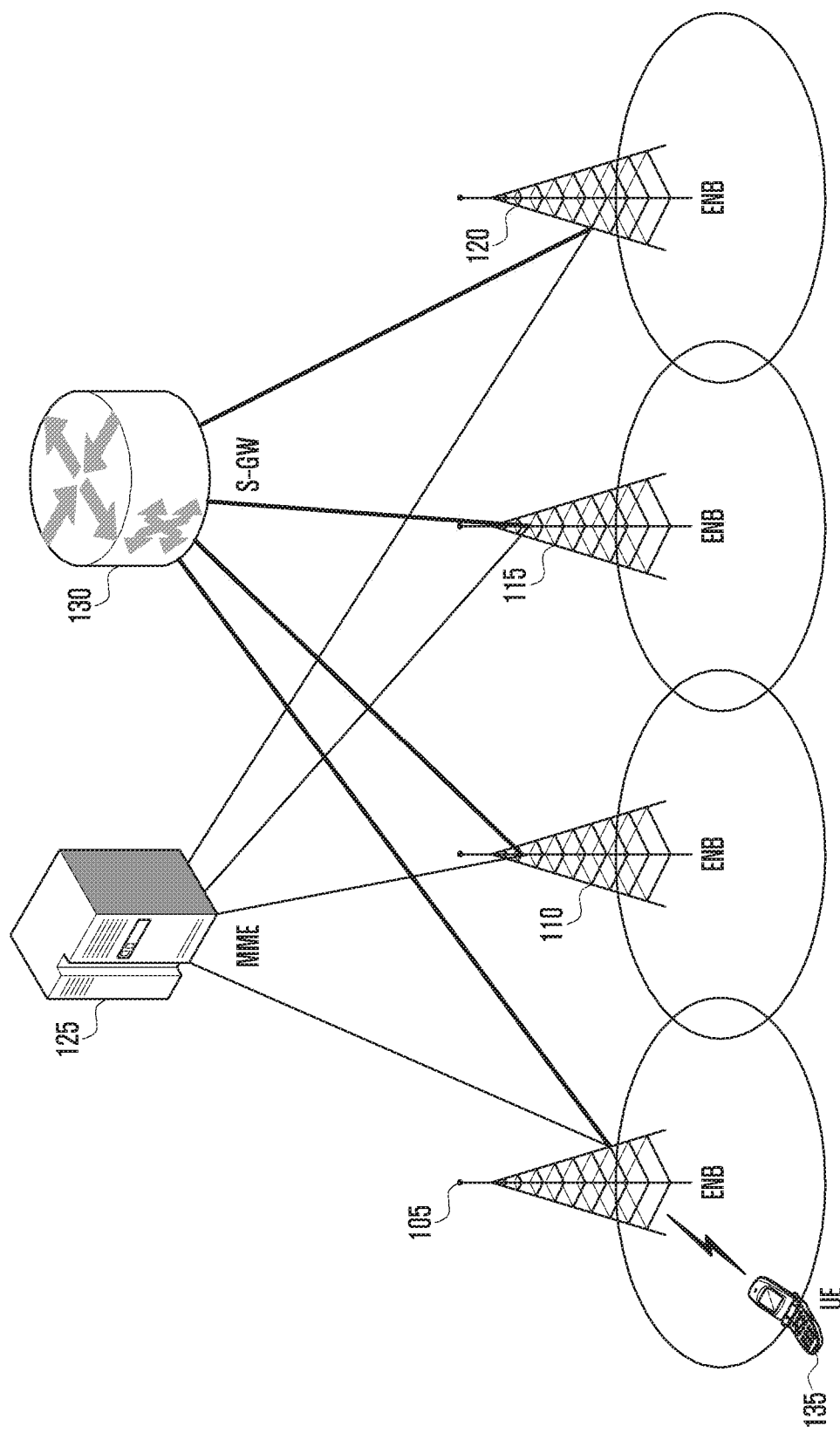
FIG. 1 is a diagram illustrating an architecture of a Long Term Evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes the following methods in order for a Machine Type Communication (MTC) User Equipment (UE) to select an evolved Node B (eNB) supporting MTC UE.

The eNB transmits the eNB's MTC UE supportability using a broadcast message.

The broadcast message may be a determined System Information Block (SIB).

The UE scans eNBs per frequency and, if the eNB or cell having the strongest signal on one frequency does not support MTC UE, bars the access on the frequency and reduces the priority of the corresponding frequency in a determined duration. That is, although a cell having strong signal strength is found while scanning the corresponding frequency supporting the UE for selection, the UE selects, if there is any cell found on another frequency, the cell operating on the another frequency.

Also, the present disclosure proposes the following methods in order for the MTC UE to notify the eNB that the MTC UE is a UE of a MTC UE type when the MTC UE attempts to connect the eNB.

The header of a message transmitted from the UE to the eNB in the random access procedure includes a logical channel identifier (LCID) for use at the eNB in determining whether the UE is an MTC UE.

The message transmitted from the UE to the eNB may be message 3 (Msg3) among the messages used in the random access procedure.

Upon receipt of the message including the LCID, the eNB determines the corresponding UE as an MTC UE and then applies, to the communication with the corresponding UE, transmission message size adjustment (e.g., fragmentation) and supplementary transmission scheme (e.g., retransmission).

FIG. 1 is a diagram illustrating an architecture of a Long Term Evolution (LTE) system according to an embodiment of the present disclosure.

Referring to FIG. 1, a radio access network of the LTE system includes eNBs 105, 110, 115, and 120, a Mobility Management Entity (MME) 125, and a Serving-Gateway (S-GW) 130. A UE 135 connects to an external network via the eNBs 105, 110, 115, and 120 and the S-GW 130.

Referring to FIG. 1, the eNBs 105, 110, 115, and 120 correspond to the legacy node Bs of the Universal Mobile Telecommunications System (UMTS). The eNBs 105, 110, 115, and 120 allow the UE 135 to establish a radio channel and are responsible for functions more complicated as compared to the legacy node B. In the LTE system, all the user traffic services including real time services such as Voice over Internet Protocol (VoIP) are provided through a shared channel and thus there is a need of a device to schedule data based on the state information such as buffer states, power headroom states, and channel states of the UEs, the eNBs being responsible for such functions. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
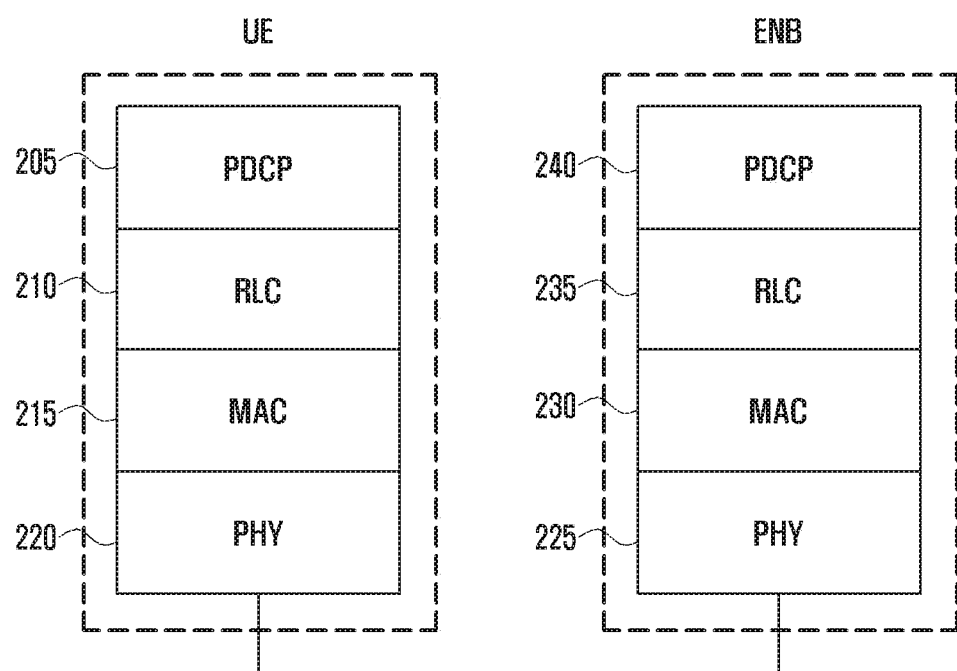
FIG. 2 is a diagram illustrating a protocol stack of an LTE system according to an embodiment of the present disclosure.

FIG. 2 is a diagram illustrating a protocol stack of an LTE system according to an embodiment of the present disclosure.

Referring to FIG. 2, a protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCPs 205 and 240 are responsible for IP header compression/decompression, and the RLCs 210 and 235 are responsible for segmenting the PDCP Protocol Data Unit (PDU) into segments in appropriate size for Automatic Repeat Request (ARQ) operation. The MACs 215 and 230 are responsible for establishing connection to a plurality of RLC entities so as to multiplex the RLC PDUs into MAC PDUs and demultiplex the MAC PDUs into RLC PDUs. The PHYs 220 and 225 performs channel coding on the MAC PDU and modulates the MAC PDU into OFDM symbols to transmit over radio channel or performs demodulating and channel-decoding on the received OFDM symbols and delivers the decoded data to the upper layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried by Physical Uplink Control Channel (PUCCH) or Physical Uplink Shared Channel (PUSCH).

Figure 3:
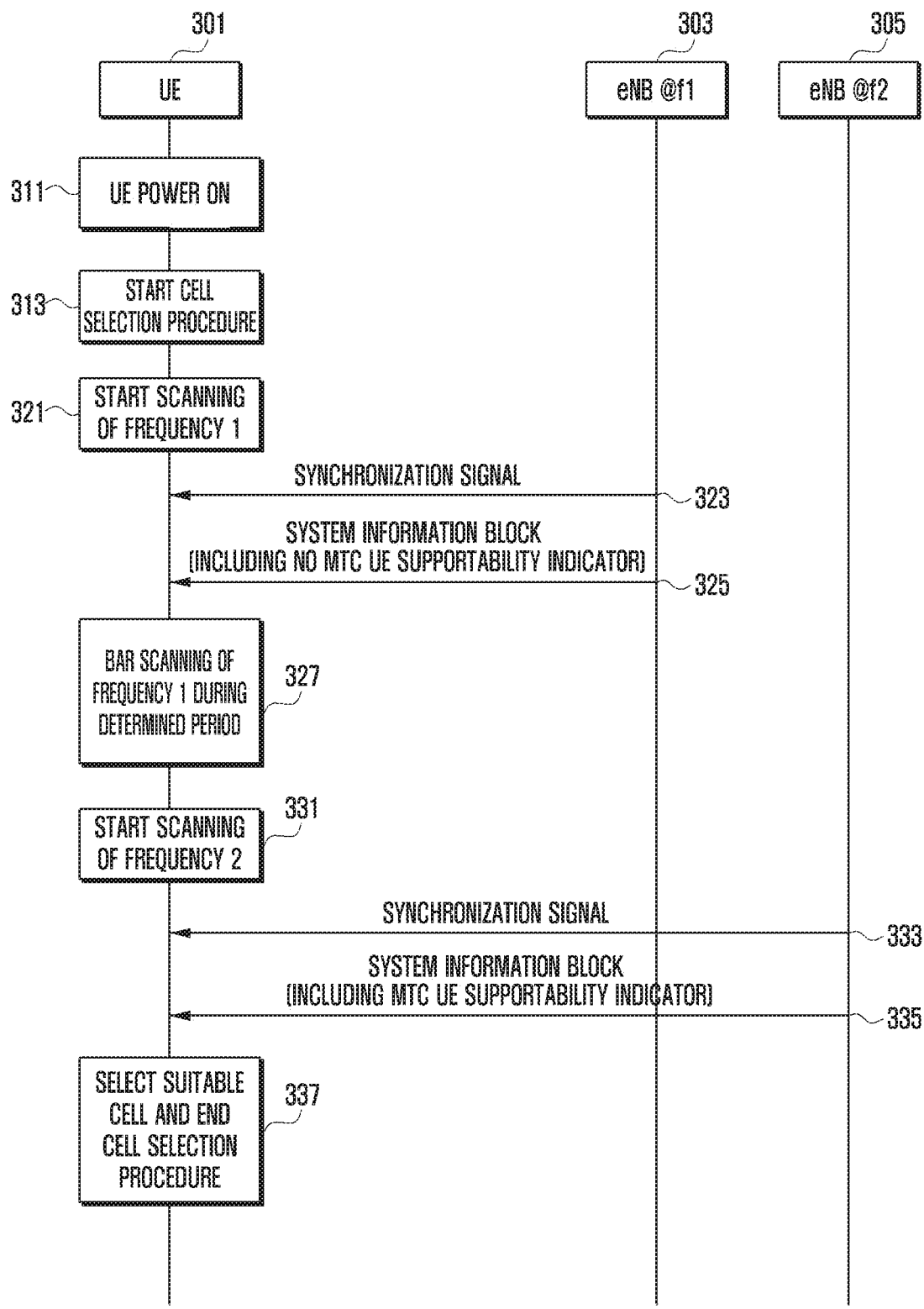
FIG. 3 is a signal flow diagram illustrating a cell selection method of a Machine Type Communication (MTC) User Equipment (UE) according to an embodiment of the present disclosure.

FIG. 3 is a signal flow diagram illustrating a cell selection method of an MTC UE according to an embodiment of the present disclosure.

Referring to FIG. 3, a UE 301 powers on at operation 311 and initiates a cell selection procedure to select a cell to camp on among the neighboring eNBs (or cells) 303 and 305 at operation 313.

For this purpose, the UE scans operating cells (frequencies) the UE supports to discover cells. Herein, the terms "frequency" and "cell" are used interchangeably in the same meaning In FIG. 3, the UE scans frequency 1 (f1) first at operation 321. After switching to the corresponding frequency to scan the frequency 1, the UE 301 receives the signals transmitted on the frequency 1. From the received signals, the UE 301 may extract synchronization signals 323 and messages 325 carrying system information. The message carrying the system information includes a plurality of SIBs that are sorted into SIB1, SIB2, SIB3, etc. according to the purpose and type of information.

The UE 301 selects an eNB 303 or 305 with the best received signal strength among eNBs 303 and 305 transmitting the synchronization signal to acquire synchronization with the corresponding eNB at operation 323 and receives messages (e.g., SIBs) from the eNB synchronized therewith at operation 325. According to an embodiment of the present disclosure, if the eNB 303 or 305 is supports the MTC UE (allows an access of the MTC UE to a cell formed by the eNB 303 or 305), the eNB 303 or 305 sends the MTC UE an indicator of notifying the UE 301 whether the eNB 303 or 305 supports the MTC UE. The indicator may be 1-bit indicator transmitted through one of the SIBs (e.g., SIB1 or an SIB defined newly). The indicator may be allowance information regarding an access of the category 0 UE to the cell formed by the eNB 303 or 305.

The UE 301 establishes synchronization with the eNB 303 or 305 having the best signal strength and quality per frequency to determine the cell to camp on and monitors the SIBs to detect the indicator indicating of the MTC UE supportability through the neighboring cell scanning If the corresponding eNB 303 or 305 does not support the MTC UE, the UE 301 blocks scanning the corresponding frequency (bars to camp on the eNB) during a determined period at operation 327. That means that the eNB 303 or 305 bars a selection of a cell if the eNB 303 or 305 does not allows an access of MTC UE to the cell formed by the eNB 303 or 305. This is to prevent the MTC UE from staying in the coverage of the eNB 303 or 305, which does not support the MTC UE so as to avoid communication failure afterward. In order to accomplish this, a timer or counter may be used, and the length of the timer or the value of the counter may be set to a value predefined in the standard or carried in the SIB message transmitted by the eNB 303 or 305 supporting MTC. For example, the eNB 303 or 305 may broadcast the timer value for barring to camp on (e.g., 1 minute) in the SIB 1 in order for the UEs located within the cell to receive the timer value. If the timer value is received, the MTC UE starts the timer when the cell having the best signal strength on a specific frequency does not support MTC to reduce the cell selection priority of the corresponding frequency during the time corresponding to the timer (1 minute in this embodiment of the present disclosure). The timer or counter may start when it is determined that the corresponding eNB 303 or 305 does not support MTC for the reason of reception failure of the MTC indicator. The UE 301 may bar the frequencies on which the cells supporting MTC operate after the completion of cell search or upon or after determining the frequency or cell to camp on.

After finding the eNB 303 or 305 having the best signal strength on the frequency 1, the UE 301 switches the frequency to the frequency 2 (f2) to search for the eNB 303 or 305 having the best signal strength on the f2 at operation 331.

Like the operation on the f1, the UE 301 selects the eNB 303 or 305 having the best signal strength among the eNBs 303 and 305 operating on the ff2 to establish synchronization with the corresponding eNB at operation 333 and receives the messages (e.g. SIBs) transmitted by the corresponding eNB 303 or 305 at operation 335. It is assumed the eNB 303 or 305 with which the synchronization is acquired on the ff2 is the eNB 303 or 305 supporting MTC. As described above, the eNB 303 or 305 with which the synchronization is acquire on the ff2 may transmit the system information block including the indicator notifying whether the eNB 303 or 305 supports MTC. Although FIG. 3 is directed to the case where the UE 301 performs the procedure of receiving from the eNBs 303 and 305 operating on two frequencies (f1 and f2), the present disclosure is not limited thereto. For example, the UE may perform the above procedure on 15 (f1 to f15) frequencies.

The UE 301 checks information on the cells having the best signal strength on the respective frequencies, checks the MTC supportabilities of the cells, and determines the cell to camp thereon based on the operator information and MTC cell supportabilities of the per-frequency cells at operation 337. As described above, if the non-MTC cells are barred, the UE 301 may bar scanning the corresponding frequencies since the eNB 303 or 305 is determined as non-MTC eNB at operation 327, the barring state may last until operation 337. Unlike this, the UE 301 may bar the frequencies on which the cells supporting MTC operate after the completion of cell scanning or upon or after determining the frequency or cell to camp on.

Figure 4:
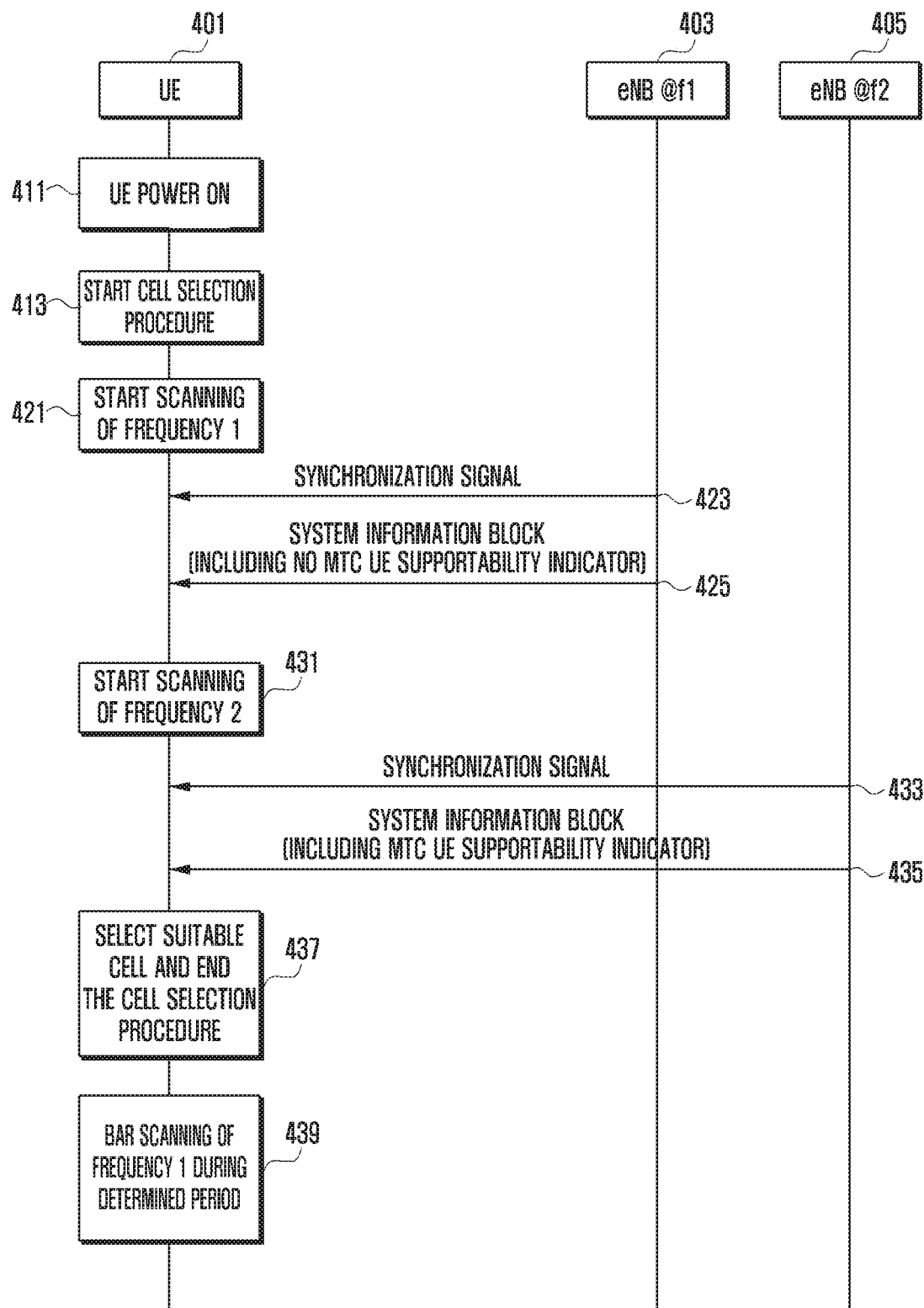
FIG. 4 is a signal flow diagram illustrating a cell selection method of an MTC UE according to an embodiment of the present disclosure.

FIG. 4 is a signal flow diagram illustrating a cell selection method of an MTC UE according to an embodiment of the present disclosure.

Referring to FIG. 4, a UE 401 powers on at operation 411 and starts the cell selection procedure to select one of the cell among the neighboring cells (or eNBs) 403 and 405 at operation 413.

Since operations 421, 423, 425, 431, 433, 435, and 437 of FIG. 4 are identical with operations 321, 323, 325, 331, 333, 335, and 337 of FIG. 3, detailed descriptions thereof are omitted herein. Although FIG. 4 is directed to the case where two frequencies are scanned, the present disclosure is not limited thereto.

Referring to FIG. 3, if it is determined that the corresponding eNB 403 or 405 does not support MTC based on the message received from the eNB, e.g. since it is determined that the corresponding eNB 403 or 405 does not support the MTC UE, the corresponding frequency is barred during a determined period. Unlike the embodiment of FIG. 4, the frequencies on which the non-MTC cells operate are barred after the completion of the cell search or upon the determination of the frequency or cell to camp on or after a determined time lapses since the determination of the frequency or cell to camp on at operation 439. FIG. 4 is directed to the case whether the f1 is barred during a determined period. Assuming that the UE 401 supports 15 frequencies (f1 to f15) unlike the embodiment of FIG. 4, the frequencies on which non-MTC cells operate (e.g. f1, f5, and f11) may be barred after the completion of the cell search on all of the 15 frequencies.

Figure 5:
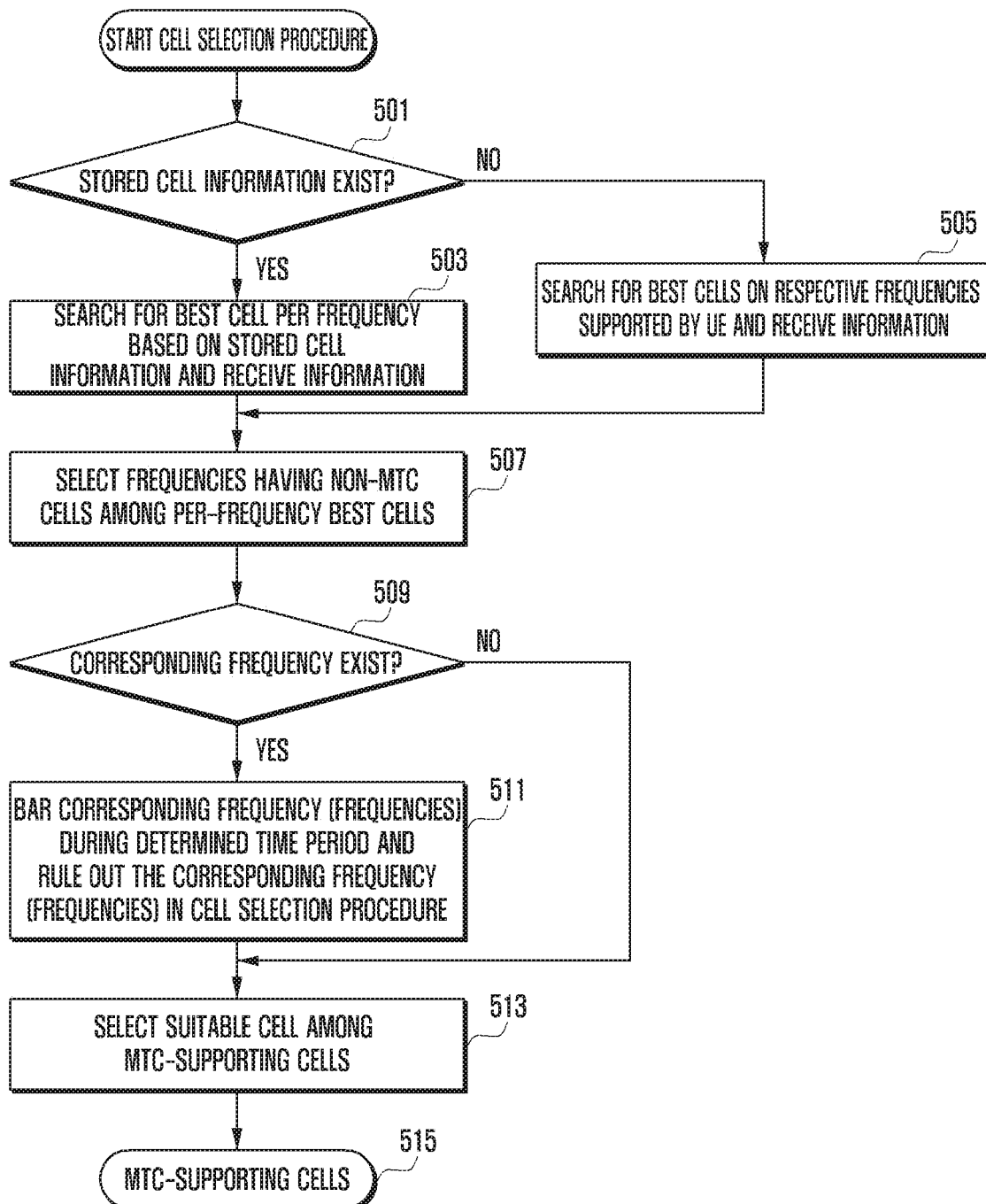
FIG. 5 is a flowchart illustrating a cell selection method of an MTC UE according to an embodiment of the present disclosure.

FIG. 5 is a flowchart illustrating a cell selection method of an MTC UE according to an embodiment of the present disclosure.

Referring to FIG. 5, if the cell selection procedure starts, the UE determines whether the previous cell selection-related information is stored at operation 501. For example, if the UE has powered on and then off, the information used in the last connection may be stored in the UE's storage. If there is such information stored in the UE, the UE selects the frequencies based on the corresponding information and searches for per-frequency best cells and receives information from the found cells at operation 503. Otherwise if there is no such information stored in the UE, the UE searches all frequencies for per-frequency best cells and receives information from the found cells at operation 505. Afterward, the UE selects the frequencies having non-MTC cells among the per-frequency best cells at operation 507. In this way, the UE may determine whether there is any non-MTC frequency depending on whether the eNB transmits the MTC indicator at operation 509 as described with reference to FIG. 3. If there are one or more non-MTC frequencies, the corresponding frequency (or frequencies) is barred during a determined period such that the UE rules out the corresponding frequency (or frequencies) in the cell selection procedure at operation 511. In order to check the expiry of the determined period, a timer or counter may be used.

Afterward, the UE selects a cell to camp on among the per-frequency cells based on the operator information and MTC UE supportability at operation 513 and ends the cell selection procedure at operation 515.

Figure 6:
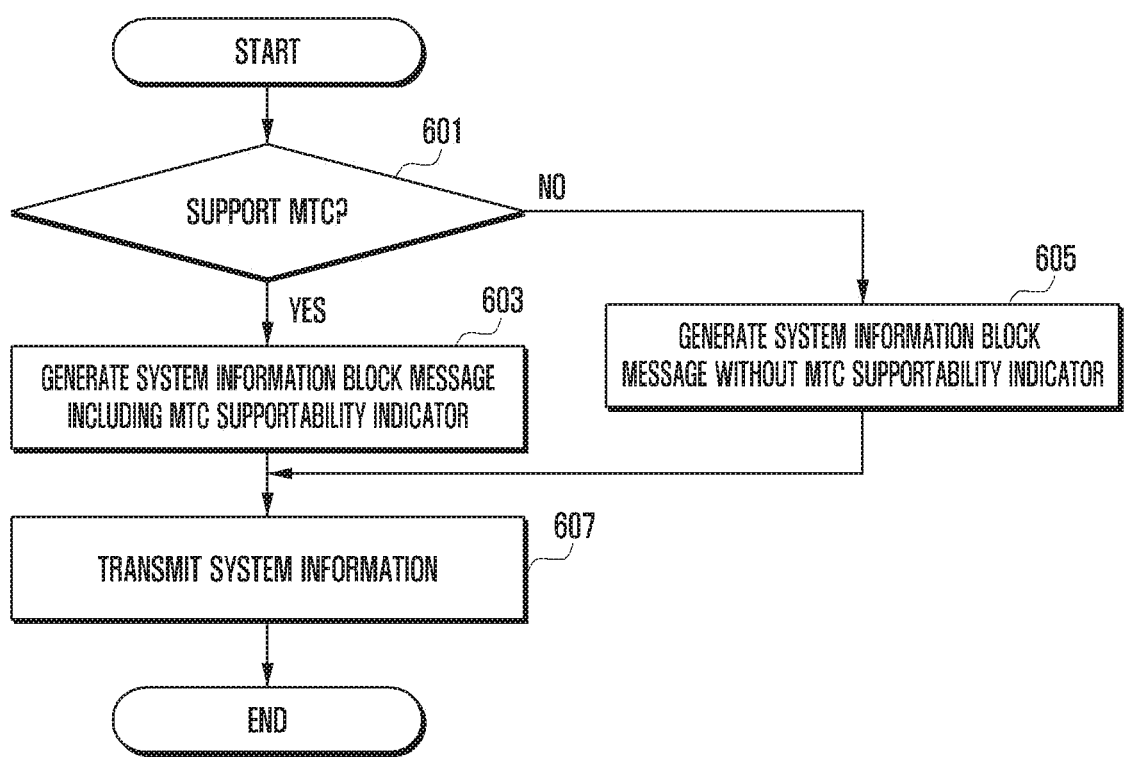
FIG. 6 is a flowchart illustrating an evolved Node B (eNB)-side procedure of a cell selection method according to an embodiment of the present disclosure.

FIG. 6 is a flowchart illustrating an eNB-side procedure of a cell selection method according to an embodiment of the present disclosure.

Referring to FIG. 6, an eNB determines whether the eNB supports MTC UE at operation 601. If the eNB supports the MTC UE, the eNB generates a system information block message including an MTC supportability indication information at operation 603. The MTC supportability indication information may include a 1-bit indicator indicating whether the eNB supports the MTC UE and information on the frequency barring time or counter value optionally. If the eNB does not support MTC UE, the eNB generates the system information block message without MTC support indication information at operation 605. Next, the eNB transmits the generated system information block to the UE at operation 607.

Figure 7:
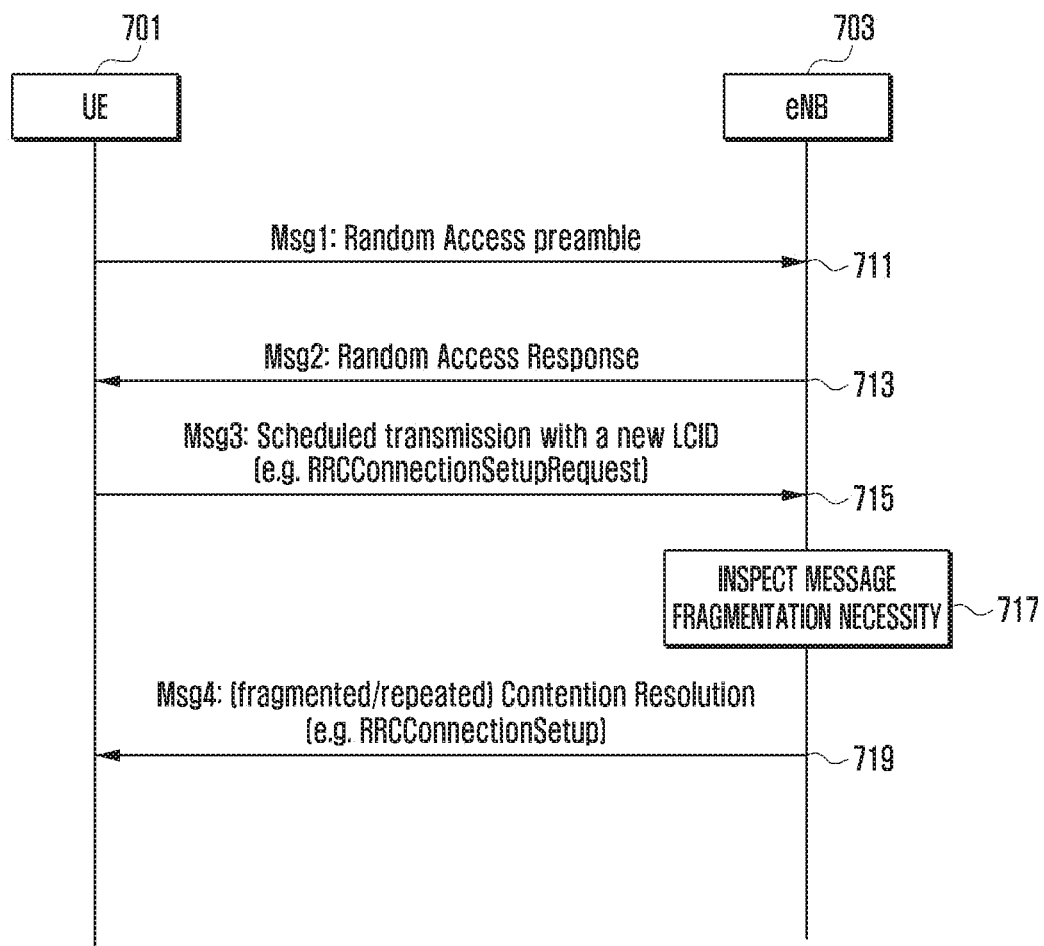
FIG. 7 is a signal flow diagram illustrating a random access procedure of a MTC UE to an eNB supporting the MTC UE according to an embodiment of the present disclosure.

FIG. 7 is a signal flow diagram illustrating a random access procedure of an MTC UE to an eNB supporting the MTC UE according to an embodiment of the present disclosure.

Referring to FIG. 7, it is assumed that a UE 701 is an MTC UE (category 0 UE) and the eNB or cell 703 supports MTC.

Since the MTC UE operates with a low transmit power and a broad coverage and may transmit small size messages during a determined period, there is a need of an MTC eNB to support the MTC UE. Meanwhile, the MTC eNB has to support normal UEs as well as MTC UEs and distinguish between the normal and MTC UEs based on the category information transmitted by the MTC UE. Category 0 is defined newly for the MTC UE and, if the corresponding category information is received, the eNB determines the corresponding UE as MTC UE and adopts a specific transmission scheme for the MTC UE (which is different from that for normal UE) in order for the MTC UE to transmit small size message at a low transmit power.

According to the method of the related art, the category information is transmitted after the UE connects to the corresponding eNB successfully so as to be in the connected mode. That is, if data communication necessity occurs in the idle mode, the UE initiates a random access procedure to enter the connected mode and, when the random access procedure is completed successfully, then it is possible for the UE to transmit the category information. Accordingly, the UE cannot identify whether the corresponding UE is a normal UE or an MTC UE in the middle of the random access procedure and thus there is a need of negating the necessity for transmitting the random access message in a specific way (e.g. repetitive transmission) or segmenting a large message into small size messages. The embodiment of FIG. 7 shows a procedure of solving such a problem.

If data communication necessity occurs in the idle mode, the UE 701 transmits a preamble (msg 1) to an eNB 703 to enter the connected mode at operation 711. The preamble may be the random access preamble which is transmitted repeatedly by a normal UE or a preamble designed newly for supporting MTC UEs with wide coverage.

Upon receipt of the preamble, the eNB 703 sends the UE 701 a RAR message (Msg2) to acknowledge the receipt of the preamble at operation 713. The RAR message includes preamble identity information and resource allocation information in order for the UE 701, which has transmitted the preamble to transmit additional message.

If the RAR message is received successfully, the UE 701 sends the eNB 703 a Connection Setup Request message (Msg3) 715. The connection Setup Request message is the Radio Resource Control (RRC) layer message such as RRCConnectionRequest message specified in the 3rd Generation Partnership Project (3GPP) standard. The UE 701 transmits the message on the resource allocated by the eNB 703. The message is transmitted in the MAC Service Data Unit (SDU) of which MAC header includes a 5-bit LCID allocated by the eNB 703. In the case of initial transmission, the UE 701 has no LCID allocated by the eNB 703 yet and thus, if the UE 701 is the normal UE, the UE 701 transmits the message using the identifier set to 00000. Table 1 shows LCID values for use in uplink. Before transitioning from the idle mode to the connected mode after completing the random access procedure successfully, the UE 701 uses the identifier set to 00000 allocated for the Common Control Channel for transmitting control message as shown in Table 1.

TABLE 1

| Index (binary) | LCID values |
| --- | --- |
| 00000 | Common Control Channel |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

However, the present disclosure proposes a method of using a separate value instead of using the LCID 00000 when the UE 701 is an MTC UE. The separate value may be one of the binary values in the range from 01011 to 11000 that are reserved currently. According to an embodiment of the present disclosure, the eNB 703 checks the LCID included in the message (Msg3) received at operation 715 to determine whether the corresponding UE 701 is a normal UE or an MTC UE. In this way, the eNB 703 may acquire the UE 701 information before the end of the random access procedure to allocate resource to the corresponding UE 701 and communicate data with the corresponding UE 701. In the case that the UE 701 is the MTC UE, the number of bits which the UE 701 may receive in one subframe (1 millisecond) is limited (e.g. 1000 bits). If, although the size of the message (Msg4) to be transmitted at operation 719 in response to the Msg3 is longer than 1000 bits, the eNB 703 transmits the data of which size is greater than 1000 bits, the UE 703 cannot receive the Msg4 correctly.

According to an embodiment of the present disclosure, if it is determined that the UE 701 is the MTC UE based on the LCID of the UE 701 at operation 715, the eNB 703 determines whether the size of the message (Msg4 in FIG. 7) to be transmitted is greater than the size allowed for the MTC UE at operation 717. If the size of the corresponding message is greater than the message size allowed for MTC UE, the eNB 703 may fragment the message or removes part of the message content for transmission at operation 719. The message may be the RRCConnectionSetup message. In this way, the UE 701 notifies the network that the UE 701 is the MTC UE before the UE 701 notifies the network of the UE 701's MTC capability so as to establish a connection with the eNB 703 successfully.

Figure 8:
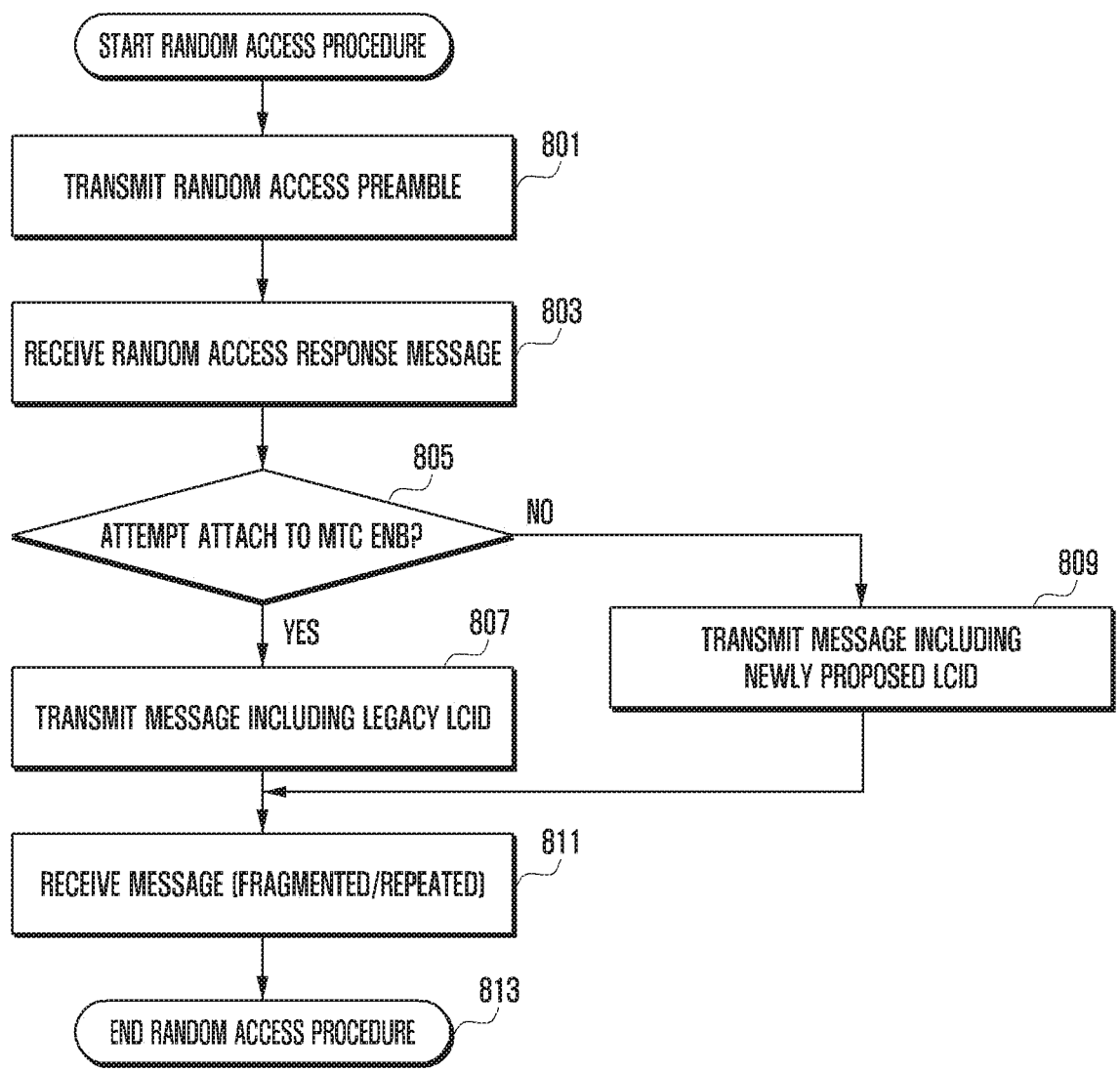
FIG. 8 is a flowchart illustrating a UE-side procedure of a random access procedure to an eNB supporting an MTC UE according to an embodiment of the present disclosure.

FIG. 8 is a flowchart illustrating a UE-side procedure of a random access procedure to an eNB supporting MTC UE according to an embodiment of the present disclosure.

Referring to FIG. 8, in the random access procedure, the UE transmits a random access preamble to an eNB at operation 801. Afterwards, the UE receives a RAR message in response to the random access preamble at operation 803. As shown in FIG. 3 or 4, the eNB determines whether the eNB supports MTC based on the MTC supportability indicator at operation 805. If the eNB does not support the MTC UE, the eNB transmits a message having a MAC header including a legacy LCID value at operation 807. If the eNB supports the MTC UE, the eNB transmits a message having the MAC header including a new LCID proposed in the present disclosure at operation 809. Afterward, UE receives a message processed suitable for MTC UE (e.g. fragmented or repeated message) from the eNB at operation 811 and ends the random access procedure at operation 813.

Figure 9:
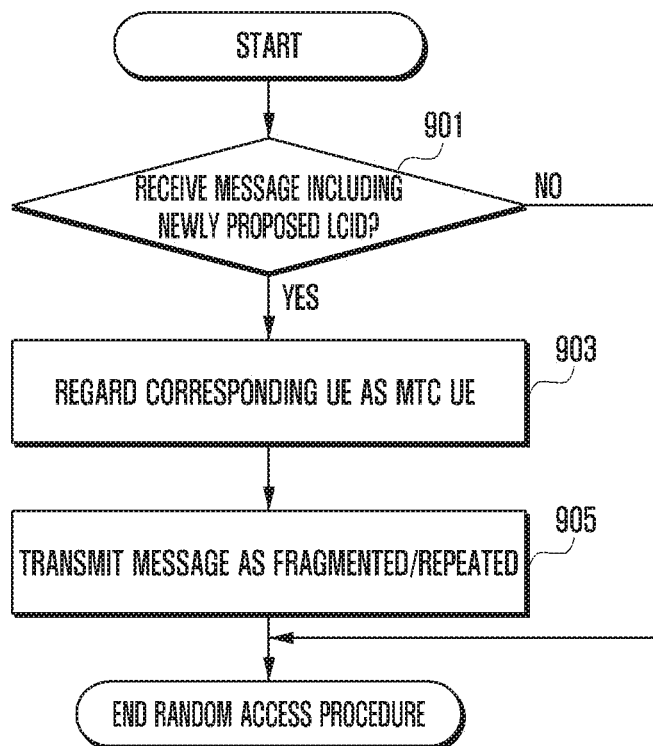
FIG. 9 is a flowchart illustrating an eNB-side procedure of a random access procedure to an eNB supporting an MTC UE according to an embodiment of the present disclosure.

FIG. 9 is a flowchart illustrating an eNB-side procedure of a random access procedure to the eNB supporting MTC UE according to an embodiment of the present disclosure.

Referring to FIG. 9, if a message is received on the allocated resource, an eNB determines whether the received message has a MAC header including an LCID proposed newly in the present disclosure at operation 901 and, if the received message includes the newly proposed LCID, the eNB determines the corresponding UE as the MTC UE at operation 903 and determines whether the size of the message (Msg4 in FIG. 7) to be transmitted is greater than the message size allowed for MTC UE. If the size of the message is greater than the message allowed for MTC UE, the eNB fragment the corresponding message or removes part of the message content for transmission at operation 905. In this way, the UE notifies the network of the UE category in advance before transmitting the UE category information so as to establish a connection with the eNB successfully.

Figure 10:
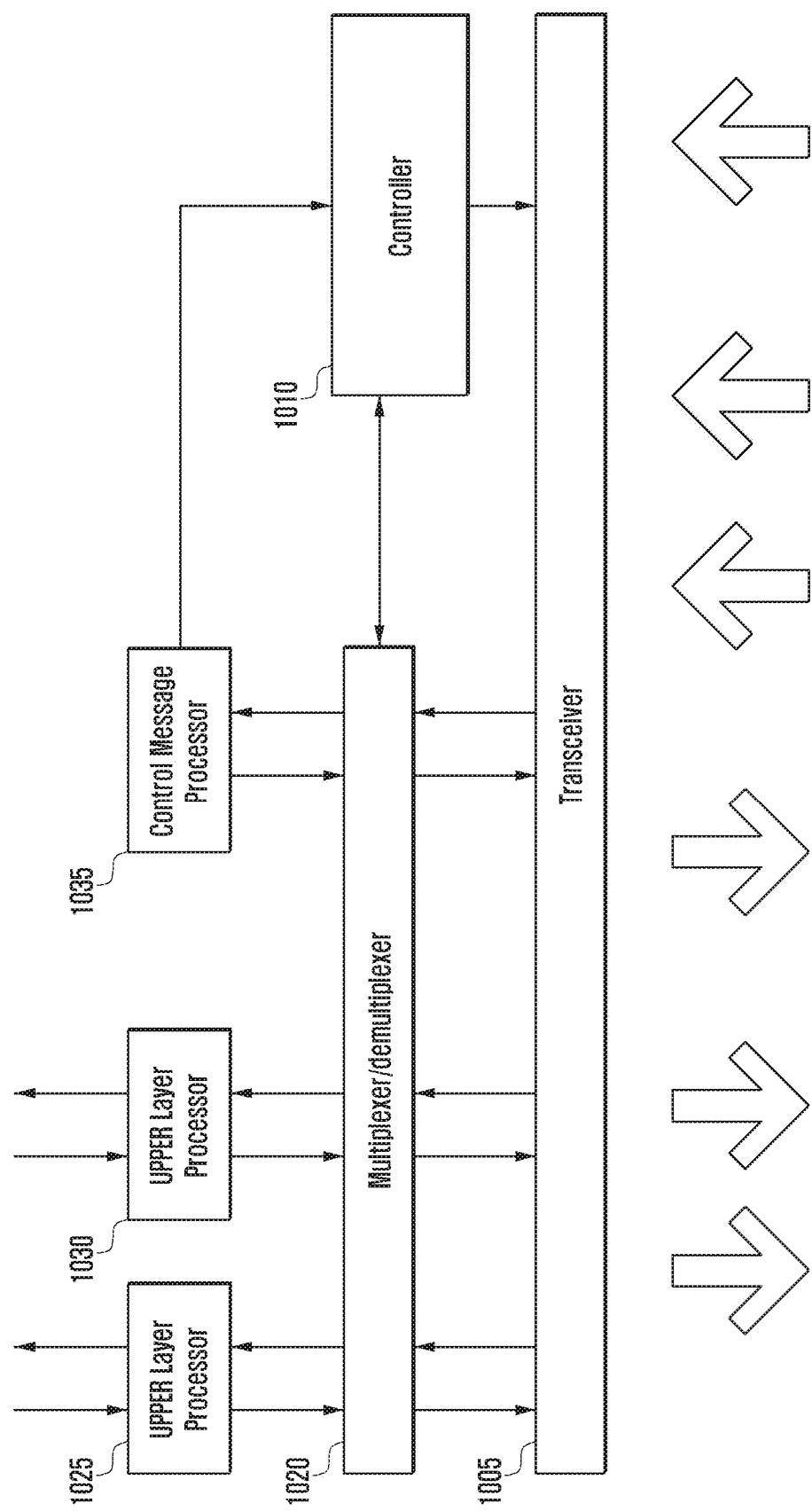
FIG. 10 is block diagram illustrating a configuration of the UE according to an embodiment of the present disclosure.

FIG. 10 is block diagram illustrating a configuration of the UE according to an embodiment of the present disclosure.

Referring to FIG. 10, a UE according to an embodiment of the present disclosure includes a transceiver 1005, a controller 1010, a multiplexer/demultiplexer 1020, a control message processor 1035, and upper layer processor 1025 and 1030.

The transceiver 1005 is responsible for receiving data and a determined control signal through a downlink channel of the serving cell and transmitting data and determined control signals through an uplink channel In the case that a plurality of serving cells is configured, the transceiver 1005 transmits and receives data and control signals through the plural serving cells.

The multiplexer/demultiplexer 1015 is responsible for multiplexing data generated by the upper layer processors 1020 and 1025 and the control message processor 1035 or demultiplexing data received by the transceiver 1005 to deliver the demultiplexed data to the upper layer processors 1025 and 1030 and the control message processor 1035.

The control message processor 1035 processes the control message received from the eNB and takes a necessary action.

The upper layer processor 1025 and 1030 is established per service. The upper layer processors 1025 and 1030 process the data generated in the user service such as File Transfer Protocol (FPT) and VoIP and transfers the processed data to the multiplexer/demultiplexer 1020 or processes the data from the multiplexer/demultiplexer 1020 and delivers the processed data to the upper layer service applications.

The controller 1010 checks the scheduling command, e.g. uplink grants, received through the transceiver 1005 and controls the transceiver 1005 and the multiplexer/demultiplexer 1020 to perform uplink transmission with appropriate transmission resource at an appropriate timing.

The control message processor 1035 controls such that the Msg3 message including the newly proposed LCID value is transmitted in the random access procedure when the UE is the MTC UE and thus the eNB is aware of the UE category before receiving the MTC UE notification message as an upper layer message.

Although the transceiver 1005, the controller 1010, the multiplexer/demultiplexer 1020, the control message processor 1035, and the upper layer processor 1025 and 1030 are depicted as separate blocks responsible for different functions in FIG. 10 for explanation convenience, the configuration is not limited thereto. For example, if a message is received from the eNB, the controller 1010 determines whether the message includes an MTC UE supportability indicator and, if no MTC UE supportability indicator is included, the UE bars the frequencies of the corresponding eNB for cell search during a determined period. This message may be a broadcast message. The broadcast message may be a SIB. The controller 1010 may bar the corresponding frequency right after it is determined that the message has no MTC UE supportability indicator. The controller also may bar the corresponding frequency after the completion of cell search or upon or after a determined time since the determination of the frequency or cell to camp on. If the cell search has been completed on all the frequencies supported by the UE, the controller 1010 may select the cell to camp on based on the operator information or MTC UE supportability.

If the RAR message is received from the eNB, the controller 1010 controls to transmit to connection setup request message to the eNB and receive a connection setup message from the eNB in response to the RAR message. The connection setup request message may include an indicator notifying that the UE is the MTC UE. The connection setup request message may be the RRCConnectionRequest message. The indicator informing that the UE is the MTC UE may be included in the MAC header of the connection setup request message. The indicator informing that the UE is the MTC UE may be LCID set to a value in the range from 0b01011 to 0b11000. The connection setup message may be of being fragmented or repeated.

Figure 11:
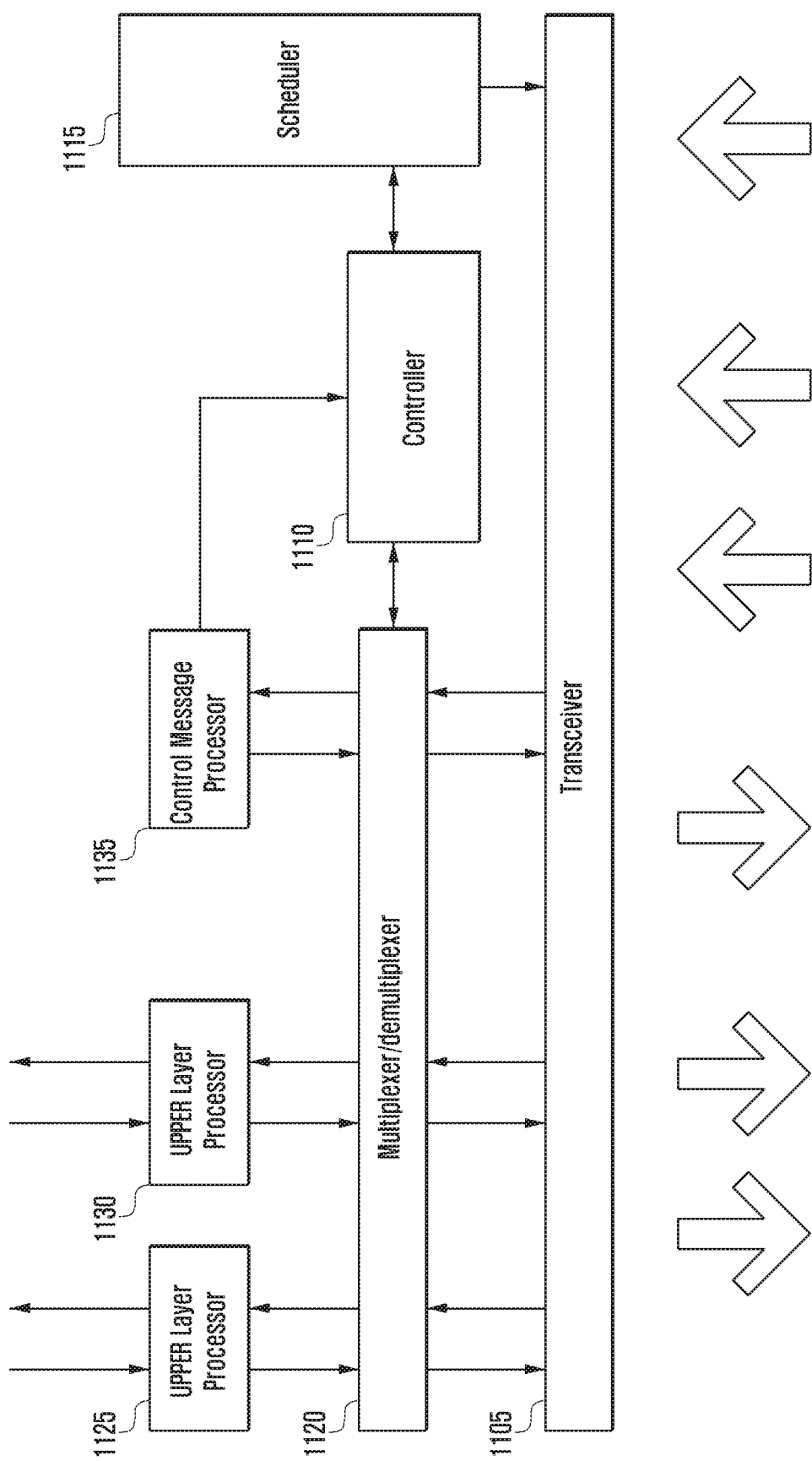
FIG. 11 is a block diagram illustrating a configuration of an eNB according to an embodiment of the present disclosure.

FIG. 11 is a block diagram illustrating a configuration of an eNB according to an embodiment of the present disclosure.

Referring to FIG. 11, an eNB includes a transceiver 1105, a controller 1110, a scheduler 1115, a multiplexer/demultiplexer 1120, a control message processor 1135, upper layer processors 1125 and 1130.

The transceiver 1105 is responsible for transmitting data and a determined control signal through a downlink channel and receiving data and the determined control signals through an uplink channel. In the case that a plurality of carriers is configured, the transceiver 1105 transmits and receives data and control signals through the plural carriers.

The multiplexer/demultiplexer 1120 is responsible for multiplexing data generated by the upper layer processors 1125 and 1130 and the control message processor 1135 or demultiplexing data received by the transceiver 1105 to deliver the demultiplexed data to the upper layer processors 1125 and 1130, the control message processor 1135, and the controller 1110. The control message processor 1135 processes the control message transmitted by the UE to take a necessary action or generates a control message addressed to the UE to the lower layer.

The upper layer processor 1125 (or 1130) is established per service, processes the data to be transmitted to the S-GW or another eNB into RLC PDU and transfers the RLC PDU to the multiplexer/demultiplexer 1120, and processes the RLC PDU from the multiplexer/demultiplexer 1120 into PDCP SDU to be transmitted to the S-GW or another eNB.

The controller 1110 controls the transceiver 1105 to receive the channel state information transmitted by the UE.

The scheduler 1115 allocates transmission resource to the UE at an appropriate timing in consideration of the buffer state and channel condition of the UE and processes the signal transmitted from the UE or to be transmitted to the UE by means of the transceiver 1105.

The control message processor 1135 transmits an SIB message including the MTC supportability indicator to the UE and, if a message including a newly proposed LCID is received from the UE, the eNB determines that the corresponding UE is the MTC UE so as to transmit data in the manner of being repeated or fragmented.

Although the transceiver 1105, the controller 1110, the multiplexer/demultiplexer 1120, the control message processor 1135, and the upper layer processor 1025 and 1030 are depicted as separate blocks responsible for different functions in FIG. 11 for explanation convenience, the configuration is not limited thereto. For example, the controller 1110 may determine whether the eNB supports MTC UE and, if so, generates a message including an indicator of whether the eNB supports MTC UE, and transmits the message to the UE. This message may be a broadcast message. The broadcast message may be a SIB.

The controller 1110 may receive a connection setup request message from the UE, determine whether the UE is an MTC UE, check whether the size of the connection setup message to be transmitted to the UE is greater than a determined size allowed for the UE to receive and, if so, transmit the connection setup message in the manner of being repeated or fragmented. The MTC UE indication information may be included in the MAC header of the connection setup request message. The MTC UE indication information may be an LCID set to a value in the range from 0b01011 to 0b11000.

As described above, the network selection and random access method and apparatus of the present disclosure is advantageous in that the MTC UE selects the network supporting MTC UE class for coverage extension and service enhancement and the eNB configures the data size suitable for the MTC UE so as to avoid malfunction of the MTC UE and secure broad coverage of the UE using an MTC-specific transmission scheme.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
receiving a first message including system information from a base station associated with a cell;
determining whether the system information includes allowance information indicating that a category 0 terminal is allowed to access the cell;
barring a selection of the cell, in case that the system information does not include the allowance information;
transmitting a random access preamble to the base station, in case that the system information includes the allowance information;
receiving a random access response (RAR) message from the base station as a response to the random access preamble;
transmitting a second message for requesting an establishment of radio resource control (RRC) connection on common control channel (CCCH) to the base station as a response to the RAR message; and
receiving a third message for establishing the RRC connection as a response to the second message,
wherein information indicating that the CCCH is for the category 0 terminal is transmitted with the second message to the base station, and
wherein the category 0 terminal is characterized as having a maximum data rate of 1000 bits within a subframe.

2. The method of claim 1, wherein the first message comprises a system information block (SIB).

3. The method of claim 1, wherein the information indicating that the CCCH is for the category 0 terminal is contained in a medium access control (MAC) header.

4. The method of claim 1, wherein the information indicating that the CCCH is for the category 0 terminal includes a logical channel identifier (LCID) set to a determined value and the determined value is different from 00000.

5. The method of claim 1, wherein the third message is received as fragmented form of the third message or removed form of part of the third message.

6. A terminal in a wireless communication system, the terminal comprising:
a transceiver; and
a controller configured to:
control the transceiver to receive a first message including system information from a base station associated with a cell, determine whether the system information includes allowance information indicating that a category 0 terminal is allowed to access the cell, bar a selection of the cell, in case that the system information does not include the allowance information, control the transceiver to transmit a random access preamble to the base station, in case that the system information includes the allowance information, control the transceiver to receive a random access response (RAR) message from the base station as a response to the random access preamble, control the transceiver to transmit a second message for requesting an establishment of radio resource control (RRC) connection on common control channel (CCCH) to the base station as a response to the RAR message, and control the transceiver to receive a third message for establishing the RRC connection as a response to the second message, wherein information indicating that the CCCH is for the category 0 terminal is transmitted with the second message to the base station, and wherein the category 0 terminal is characterized as having a maximum data rate of 1000 bits within a subframe.

7. The terminal of claim 6, wherein the first message comprises a system information block (SIB).

8. The terminal of claim 6, wherein the information indicating that the CCCH is for the category 0 terminal is contained in a medium access control (MAC) header.

9. The terminal of claim 6, wherein the information indicating that the CCCH is for the category 0 terminal includes a logical channel identifier (LCID) set to a determined value and the determined value is different from 00000.

10. The terminal of claim 6, wherein the third message is received as fragmented form of the third message or removed form of part of the third message.

11. A method performed by a base station in a wireless communication system, the method comprising:

determining whether to allow an access of a category 0 terminal to a cell associated with the base station;

generating a first message including allowance information indicating that the category 0 terminal is allowed to access the cell, in case that the base station allows the access of the category 0 terminal to the cell;

broadcasting the first message;

receiving a random access preamble from a terminal;

transmitting a random access response (RAR) message for the terminal as a response to the random access preamble;

receiving, from the terminal, a second message for requesting an establishment of radio resource control (RRC) connection on common control channel (CCCH) as a response to the RAR message, the second message including information indicating that the CCCH is for the category 0 terminal;

identifying that the terminal is the category 0 terminal based on the information indicating that the CCCH is for the category 0 terminal; and transmitting, to the terminal, a third message for establishing the RRC connection as a response to the second message, wherein the category 0 terminal is characterized as having a maximum data rate of 1000 bits within a subframe.

12. The method of claim 11, wherein the first message comprises a system information block (SIB).

13. The method of claim 11, wherein the information indicating that the CCCH is for category 0 terminal is contained in a medium access control (MAC) header.

14. The method of claim 11, wherein the information indicating that the CCCH is for the category 0 terminal includes a logical channel identifier (LCID) set to a determined value and the determined value is different from 00000.

15. A base station in a wireless communication system, the base station comprising:

a transceiver; and a controller configured to:

determine whether to allow an access of a category 0 terminal to a cell associated with the base station, generate a first message including allowance information indicating that the category 0 terminal is allowed to access the cell, in case that the base station allows the access of the category 0 terminal to the cell, control the transceiver to broadcast the first message, control the transceiver to receive a random access preamble from a terminal, control the transceiver to transmit a random access response (RAR) message for the terminal as a response to the random access preamble, control the transceiver to receive, from the terminal, a second message for requesting an establishment of radio resource control (RRC) connection on common control channel (CCCH) as a response to the RAR message, the second message including information indicating that the CCCH is for the category 0 terminal, identify that the terminal is the category 0 terminal based on information indicating that the CCCH is for the category 0 terminal, and control the transceiver to transmit, to the terminal, a third message for establishing the RRC connection as a response to the second message, wherein the category 0 terminal is characterized as having a maximum data rate of 1000 bits within a subframe.

16. The base station of claim 15, wherein the first message comprises a system information block (SIB).

17. The base station of claim 15, wherein the information indicating that the CCCH is for the category 0 terminal is contained in a medium access control (MAC) header.

18. The base station of claim 15, wherein the information indicating that the CCCH is for the category 0 terminal includes a logical channel identifier (LCID) set to a determined value and the determined value is different from 00000.

* * * * *